(12) United States Patent
Prugarewicz

(10) Patent No.: US 7,273,243 B2
(45) Date of Patent: Sep. 25, 2007

(54) SEAT FOR A REAR ROW OF SEATS IN A VEHICLE

(75) Inventor: Michal Prugarewicz, Fislisbach (CH)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 11/500,487

(22) Filed: Aug. 8, 2006

(65) Prior Publication Data

US 2007/0029832 A1 Feb. 8, 2007

(30) Foreign Application Priority Data

Aug. 8, 2005 (DE) ...................... 10 2005 037 385

(51) Int. Cl.
*B60N 2/04* (2006.01)
*B60N 2/08* (2006.01)
*B60N 2/30* (2006.01)

(52) U.S. Cl. ............... 296/65.09; 296/65.05; 296/65.16; 296/69; 297/15; 297/378.12

(58) Field of Classification Search ............ 296/65.01, 296/65.05, 65.08, 65.09, 65.16, 65.17, 69; 297/15, 321, 326, 331, 334, 378.12
See application file for complete search history.

(56) References Cited

U.S. PATENT DOCUMENTS

| | | | | |
|---|---|---|---|---|
| 6,099,072 A | * | 8/2000 | Sturt et al. | 297/15 |
| 6,123,380 A | * | 9/2000 | Sturt et al. | 296/65.09 |
| 6,375,255 B1 | * | 4/2002 | Maruta et al. | 297/15 |
| 6,568,736 B2 | * | 5/2003 | Jach et al. | 296/65.09 |
| 6,676,198 B2 | * | 1/2004 | Demptos et al. | 296/187.03 |
| 6,705,658 B2 | * | 3/2004 | Jach et al. | 296/65.09 |
| 6,991,293 B2 | * | 1/2006 | Lang et al. | 297/336 |
| 7,014,260 B2 | * | 3/2006 | Moriyama et al. | 297/15 |

(Continued)

FOREIGN PATENT DOCUMENTS

DE    103 45 181 A1    4/2004

(Continued)

OTHER PUBLICATIONS

German Office Action dated Feb. 3, 2006 in German Application No. 10 2005 037 385.2-16, filed Aug. 8, 2005 (3 pages).

(Continued)

*Primary Examiner*—Dennis H. Pedder
*Assistant Examiner*—Greg Blankenship
(74) *Attorney, Agent, or Firm*—Shlesinger, Arkwright & Garvey LLP

(57) ABSTRACT

Seat for a rear row of seats in a vehicle, which seat can be collapsed into a recess positioned in the cargo area behind the row of seats for the purpose of expanding cargo space, so that the back side of the backrest, which is folded forward onto the seat portion, is facing upward, and is essentially flush with the cargo area floor. The seat improves the kinematics of known seats and thereby makes the seat more ergonomically favorable in terms of its operation. The conversion of the seat from its use position to its non-use position is achieved through a single operation, namely a continuous pull on a strap fastened at the back end of a two-component seat portion frame, unlike known complicated systems.

7 Claims, 5 Drawing Sheets

U.S. PATENT DOCUMENTS

| | | | |
|---|---|---|---|
| 7,040,685 B2 * | 5/2006 | Sumida et al. | 296/69 |
| 7,066,539 B2 * | 6/2006 | Hatta et al. | 297/344.14 |
| 7,152,922 B2 * | 12/2006 | Garland | 297/362.11 |
| 7,188,883 B2 * | 3/2007 | Van Dyk et al. | 296/65.01 |
| 7,201,425 B2 * | 4/2007 | Tsujibayashi et al. | 296/65.09 |
| 7,213,861 B2 * | 5/2007 | Yokoyama et al. | 296/65.09 |
| 2005/0082883 A1 * | 4/2005 | Park | 297/15 |
| 2006/0214477 A1 * | 9/2006 | Fukada et al. | 297/15 |

FOREIGN PATENT DOCUMENTS

| | | |
|---|---|---|
| DE | 103 59 944 A1 | 7/2004 |
| DE | 10 2004 001 092 A1 | 9/2004 |
| EP | 0 990 551 A1 | 4/2000 |
| GB | 2 347 343 A | 9/2000 |

OTHER PUBLICATIONS

U.S. Appl. No. 10/358,326, filed Feb. 2003.
U.S. Appl. No. 11/213,738, filed Aug. 2005.
U.S. Appl. No. 11/230,925, filed Sep. 2005.
U.S. Appl. No. 11/238,963, filed Sep. 2005.
U.S. Appl. No. 11/284,898, filed Nov. 2005.
U.S. Appl. No. 11/299,747, filed Dec. 2005.
U.S. Appl. No. 11/328,192, filed Jan. 2006.
U.S. Appl. No. 11/346,313, filed Feb. 2006.
U.S. Appl. No. 11/377,335, filed Mar. 2006.
U.S. Appl. No. 11/387,979, filed Mar. 2006.
U.S. Appl. No. 11/413,114, filed Apr. 2006.
U.S. Appl. No. 11/444,504, filed Jun. 2006.
U.S. Appl. No. 11/481,800, filed Jul. 2006.
U.S. Appl. No. 11/520,708, filed Sep. 2006.
U.S. Appl. No. 11/528,516, filed Sep. 2006.
U.S. Appl. No. 11/543,897, filed Oct. 2006.

* cited by examiner

SEAT FOR A REAR ROW OF SEATS IN A VEHICLE

CROSS-REFERENCE TO RELATED APPLICATIONS

This application claims priority of German Application No. 10 2005 037 385.2, filed Aug. 8, 2005, and which is incorporated herein by reference.

FIELD OF THE INVENTION

The invention relates to a seat for a rear row of seats in a vehicle having rear row of seats, the seat having a backrest that can be folded forward onto its seat portion and form a folded up package which can be stowed in a recess provided in the cargo area behind the row of seats. More particularly, the invention relates to a seat for a rear row of seats in a vehicle, the seat having a backrest that can be folded forward onto its seat portion and form a folded up package which can be automatically stowed in a recess provided in the cargo area behind the row of seats.

BACKGROUND OF THE INVENTION

Seats of this type are used primarily in vans or sport utility vehicles, in order to allow a relatively small cargo area located behind the rear row of seats to be expanded, without the seats in the rear row having to be removed.

In DE 103 45 181 A1 a seat for a rear row of seats in a vehicle is described. With this seat, the rear portion of the seat portion is pivotably mounted on a cross bar, which is fastened to the floor of the vehicle on both sides of the seat and on both sides of a recess in the cargo area located behind the seat. The backrest of this seat can be folded down onto its seat portion, after which this package can be pivoted around the cross bar in the recess, so that the underside of the seat portion is facing upward, resting essentially flush with the floor of the cargo area.

A seat having very similar kinematics is described in U.S. Pat. No. 6,705,658 B2.

The disadvantage of these prior art seat arrangements is that the relatively heavy package comprised of the seat portion and the backrest must be pivoted 180°.

This disadvantage is avoided with the Toyota Sienna, a so-called SUV (sport utility vehicle), known from the PRIOR ART.

The kinematics and the basic construction of this seat are illustrated in the appended PRIOR ART FIGS. 1A-1D, which will be described in greater detail below.

The PRIOR ART vehicle seat a shown in PRIOR ART FIGS. 1A-1D is part of a rear row of seats for a vehicle, behind which, in the cargo area b, a recess c is provided into which the seat a can be collapsed in order to expand the cargo space. The backrest d can be folded around a folding axis e onto the seat portion f, as shown in PRIOR ART FIG. 1B. To accomplish this, pull is exerted on a strap g that is provided on the back side of the backrest d toward its upper end, causing a release of the mechanism that latches the backrest d to the seat portion f. The backrest d can then be folded over by manual pressure from the rear, as symbolically indicated in PRIOR ART FIG. 1A by an arrow h.

The seat portion f is attached to the vehicle floor k by front legs i and rear legs j. The front legs i are detachably supported at their lower ends on the vehicle floor k, and are linked via an upper pivot joint l to a frame of the seat portion f that is not illustrated here. The rear legs j also have a pivot joint m at their upper ends connecting them to the seat portion frame, and at their lower ends, which rest against the base of the recess c, they are attached to the recess via a pivot joint n. Below the pivot joint m, one end of a pneumatic spring o is attached to one of the legs j, while the other end is pivotably attached to the pivot joint l of one of the front legs i.

The front and rear legs i and j, respectively, of the seat a are latched in place on the base of the vehicle k. To release the latching mechanism, pull must be exerted on another strap p, which is positioned on the back side of the backrest d, near its lower end. This pull is symbolically illustrated by an arrow q in PRIOR ART FIG. 1B. Once the latching of the legs has been released, the collapsed package consisting of seat portion f and backrest d is further pivoted toward the rear around the lower pivot joint n of the rear legs j by applying additional pull to the strap p, wherein the relative positioning of the rear legs j and the seat portion f is essentially maintained. This is accomplished by the action of a cable r that is stretched between the base of the recess c and the pivot joint l of one of the front legs i, in combination with the action of the pneumatic spring o. Once this pivoting motion has been completed, the situation shown in PRIOR ART FIG. C exists. Manual pressure is then exerted on the back side of the backrest d, as indicated by an arrow s in PRIOR ART FIG. C. This causes the seat portion f to pivot together with the backrest d counterclockwise around the upper pivot joint m of the rear legs j. With this pivoting motion, via a set of rods that are not shown here, the front legs i are folded against the seat portion f and the pneumatic spring o is stressed. When the pivoting motion is completed, the seat a is completely collapsed into the recess c, so that the back side of the backrest d is facing upward and is essentially flush with the floor of the cargo area k, as shown in PRIOR ART FIG. D. In this situation the seat a is latched onto the vehicle floor. By pulling on the strap p, this latching is released for the purpose of restoring the seat a to its use position, wherein the stressed pneumatic spring o aids in returning the seat a to its upright position.

The manipulation and kinematics of the above-described seat a are laborious, as they occur in three phases or have three phases. In the first phase the backrest d is unlatched by pulling on the strap g. The backrest d must then be manually folded forward onto the seat portion f. In the second phase, first the leg latches are released by pulling on the strap p, and then the package consisting of the seat portion f and the backrest d is pivoted toward the rear by applying additional pull to the strap p, to a position in which the package is nearly vertical. In the third phase, the seat portion f and the backrest d must then be pushed manually from this position into the recess c.

OBJECTS AND SUMMARY OF THE INVENTION

An object of the invention is to provide a vehicle seat which overcomes the drawbacks of the PRIOR ART.

Another object of the present invention is to provide a vehicle seat of this type that has improved kinematics and thus a more ergonomically favorable mode of operation.

This object is attained in accordance with the invention with a vehicle seat for a rear row of seats in a vehicle, the seat including a seat portion frame, a backrest frame, a seat portion, and a backrest. The backrest is foldable forwardly onto the seat portion around a folding axis located between the seat portion frame and the backrest frame. There are front and rear legs, and the front and rear legs are each connected via a pivot joint to the seat portion frame. The front legs are detachably supported on a floor of a vehicle, in use, and the rear legs are pivotably fastened to the floor of the vehicle at their lower ends via a pivot joint, in use. The backrest is unlatchable by a strap attached to a back side of the seat, thus allowing it to be folded forward onto the seat portion to define a package, and after which the package including the seat portion and the forward-folded backrest can be pivoted around the pivot joints of the rear legs, once a latching of the legs on the vehicle floor has been released, with the back side of the backrest facing upward, into a recess that is provided in a cargo area behind the row of seats of a vehicle, in use, and such that the back side of the backrest ultimately is substantially flush with the floor of the cargo area. The seat portion frame includes a base frame and a seat cushion frame, and the front and rear legs are attached to the base frame, with the folding axis with the backrest being defined in the base frame. The back end of the seat cushion frame is connected to the backrest frame on both sides via a pivot joint arranged at a distance in front of the folding axis, and its front end is supported on both sides on the base frame via links. The strap is secured at the back end of the seat cushion frame, the strap being configured and located so that, in use, by pulling on the strap, first the folding axis of the backrest is unlatched, and so that with continued pulling on the strap with a simultaneous lowering of the seat cushion frame relative to the base frame, the backrest is automatically lowered onto the seat portion, and with continued pulling on the strap the rear legs are unlatched and the seat can be lowered into the recess of a vehicle, in use.

The seat of the invention can be converted from its use position to its non-use position, in which it is completely collapsed into a storage space or recess located behind the row of seating for the seat, in the cargo area of the vehicle, such that the back side of its backrest is essentially flush with the floor of the cargo area, by a single operation, namely with one continuous pull on a strap that is fastened to the back end of the seat cushion frame. Because the back end of the seat cushion frame is suspended with spacing from the folding axis of the backrest frame, once the backrest latching has been released, additional pulling on the strap causes an amount of torque to be exerted on the backrest, so that it automatically folds forward. Folding it forward manually, in other words folding it forward by applying pressure to the back side of the backrest is no longer necessary. At the same time, the seat cushion frame is moved downward and toward the rear relative to the base frame, whereby the package including the folded-forward backrest and the seat portion becomes flat, which is advantageous for the complete recessing of the seat into the recess.

As was already mentioned, pulling on the strap causes the seat cushion frame to shift not only downward but also toward the rear. With this, the point at which the strap applies force to the seat cushion frame is shifted a distance from the upper pivot joint of the rear legs and the base frame toward the rear. This allows the package including the seat portion and the backrest to be pivoted in an essentially horizontal orientation into the recess once the leg latching has been released by way of the strap.

In an advantageous embodiment of the invention, the essentially horizontal orientation of the backrest/seat portion package is stabilized during pivoting to the non-use position of the seat by a pneumatic spring, the spring force of which is correspondingly configured and engineered.

In order to prevent the pneumatic spring from possibly forcing the backrest/seat portion package out of its essentially horizontal position, in a further embodiment of the invention a cable is stretched between the base frame and the base of the recess, which prevents the pneumatic spring from exerting a corresponding amount of torque on the backrest/seat portion package.

Advantageous further improvements on the invention are disclosed in the remaining dependent claims.

Below, the invention will be described in greater detail with reference to an exemplary embodiment. The associated set of drawings shows:

BACKGROUND OF THE INVENTION

Figure 1A:
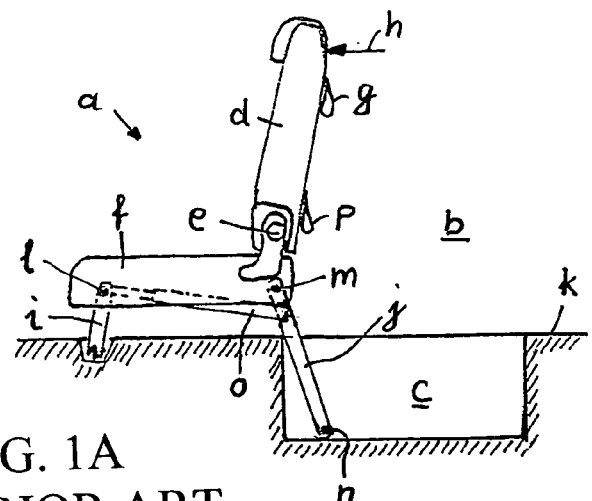
FIGS. 1A-1D illustrate the steps of folding and moving a PRIOR ART seat for a rear row of seats in a vehicle from its unfolded use to its folded non-use position.
Figure 1B:
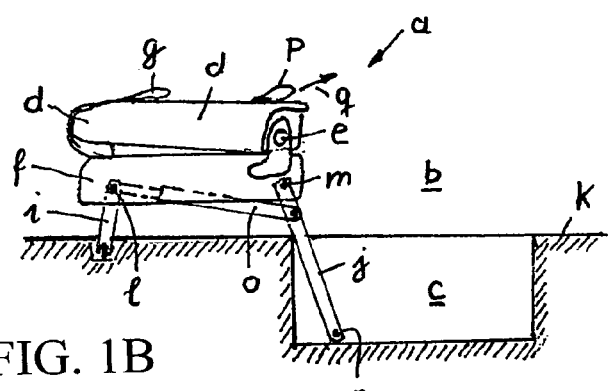
Figure 1C:
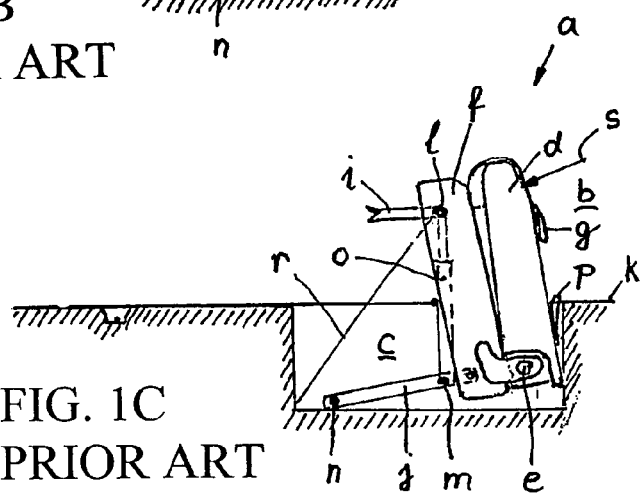
Figure 1D:
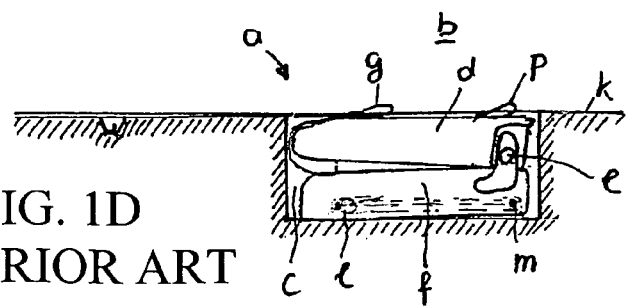

FIGS. 2-5 show an embodiment of a seat 1 according to the invention, which is arranged behind another row of seats 2 and in front of a cargo area 3 in a vehicle. It has a seat portion 4 and a backrest 5, which are shown without upholstery, in other words with only their support structures. The seat portion frame 6 includes a base frame 7 and a seat cushion frame 8. The base frame 7 is tilted upward at its back end, where it is connected to the backrest frame 9 via a folding axis 36. At its upper end, the backrest frame 9 is customarily configured with a device 10 for adjusting the height of a headrest.

The seat cushion frame 8 is supported on both sides of its front end on the front end of the base frame 7 by links 11. The links 11 are each connected via pivot joints 12 and 13 to the seat cushion frame 8 or the base frame 7, respectively.

The seat cushion frame 8 is also tilted upward at its back end, where it is attached to the backrest frame 9 via a pivot joint 14 spaced a distance a in front of the folding axis 36.

The base frame 7 of the seat portion 4 is supported on both sides by front legs 15 and rear legs 16 on the floor of the vehicle 19. The front legs 15 are connected to the base frame 7 via a pivot joint 17, and the rear legs 16 are connected to the base frame 7 via a pivot joint 18. The lower ends of the front legs 15 are detachably supported on the vehicle floor 19, while the lower ends of the rear legs 16 are mounted via pivot joints 20 to the base 21 of a recess 22 provided behind the seat 1 in the cargo area 3.

The rear legs 16 are detachably fastened approximately at the center between their pivot joints 18 and 20 to a latching bracket 23, which projects into a depression 24 in the rear legs 16 and operates in conjunction with corresponding latching devices on the rear legs 16 that are not shown here.

On one side of the seat, below the upper pivot joint 18 of the corresponding rear leg 16, one end of a pneumatic spring 26 is linked via a joint 25 onto the leg 16, with its other end being pivotably supported on the upper pivot point 17 of the corresponding front leg 15.

The front legs 15 extend upward beyond the pivot joints 17, and have at their upper ends pivot joints 27, which connect a coupler 28 to each of the front legs 15. At their other end, the couplers 28 are connected via a further pivot joint 29 to the rear legs 16. The pivot joint 29 lies between the pivot joint 25 of the pneumatic spring 26 and the upper pivot joint 18 of the rear legs 16.

At the base 21 of the recess 22, specifically at the front area of the recess 22, a tightly tensioned cable 31 is fastened at a fastening point 30, at first extending upward from the fastening point 30 approximately vertically near the leg 16 that is latched to the latching bracket 23, and then turning forward at the latching bracket 23, with its upper end being fastened to the base frame 7 at a fastening point 32.

A strap 33 is firmly bound in the rear area of the seat cushion frame 8. It is actively connected, in a manner not shown here, with the latching mechanism of the rear leg 16, and with a latching mechanism for the folding joint 36, which is not shown here.

Figure 2:
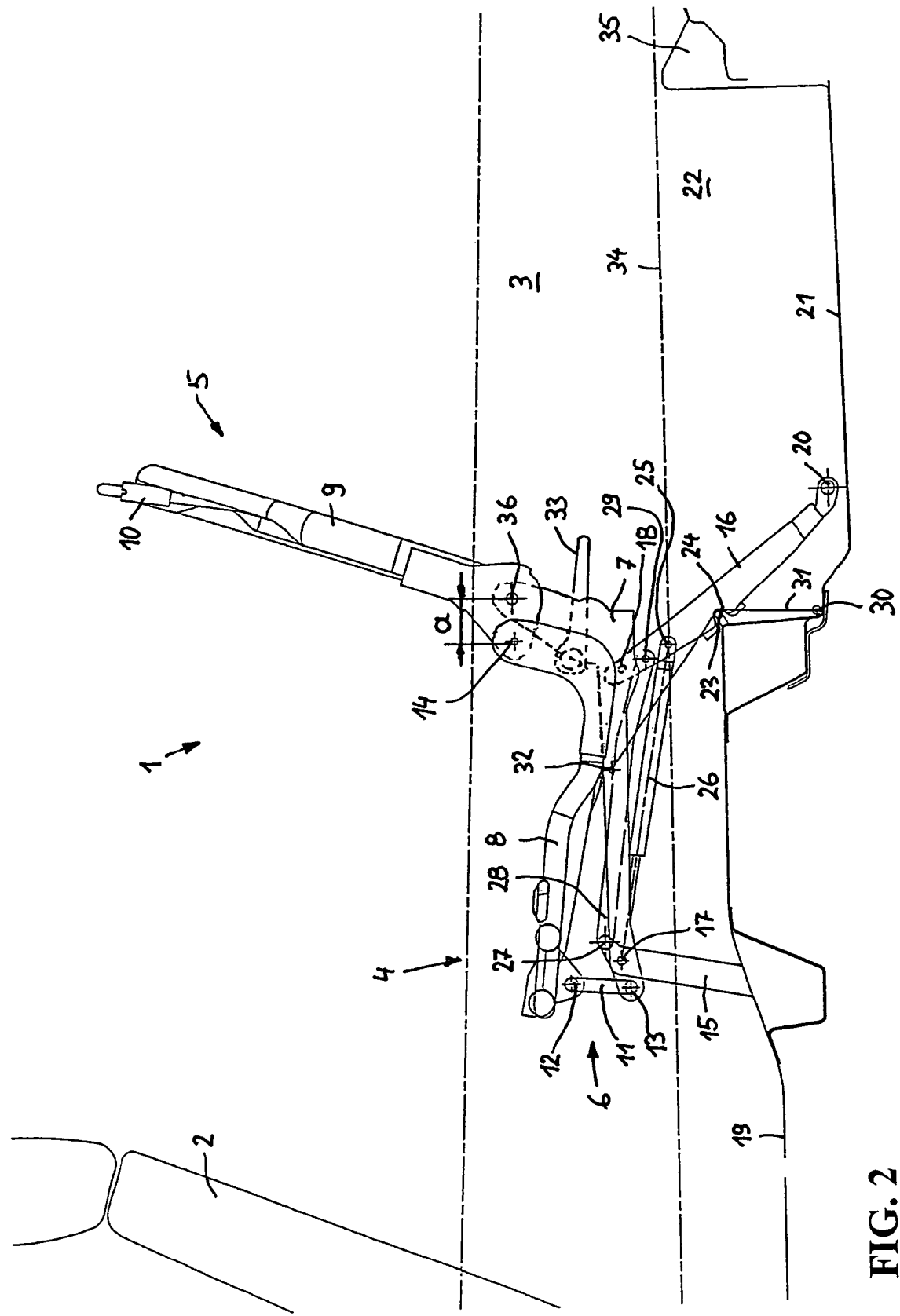
FIG. 2 is a side view of the support structure of an embodiment of an inventive seat for a rear row of seats in a vehicle, in its use position.
Figure 5:
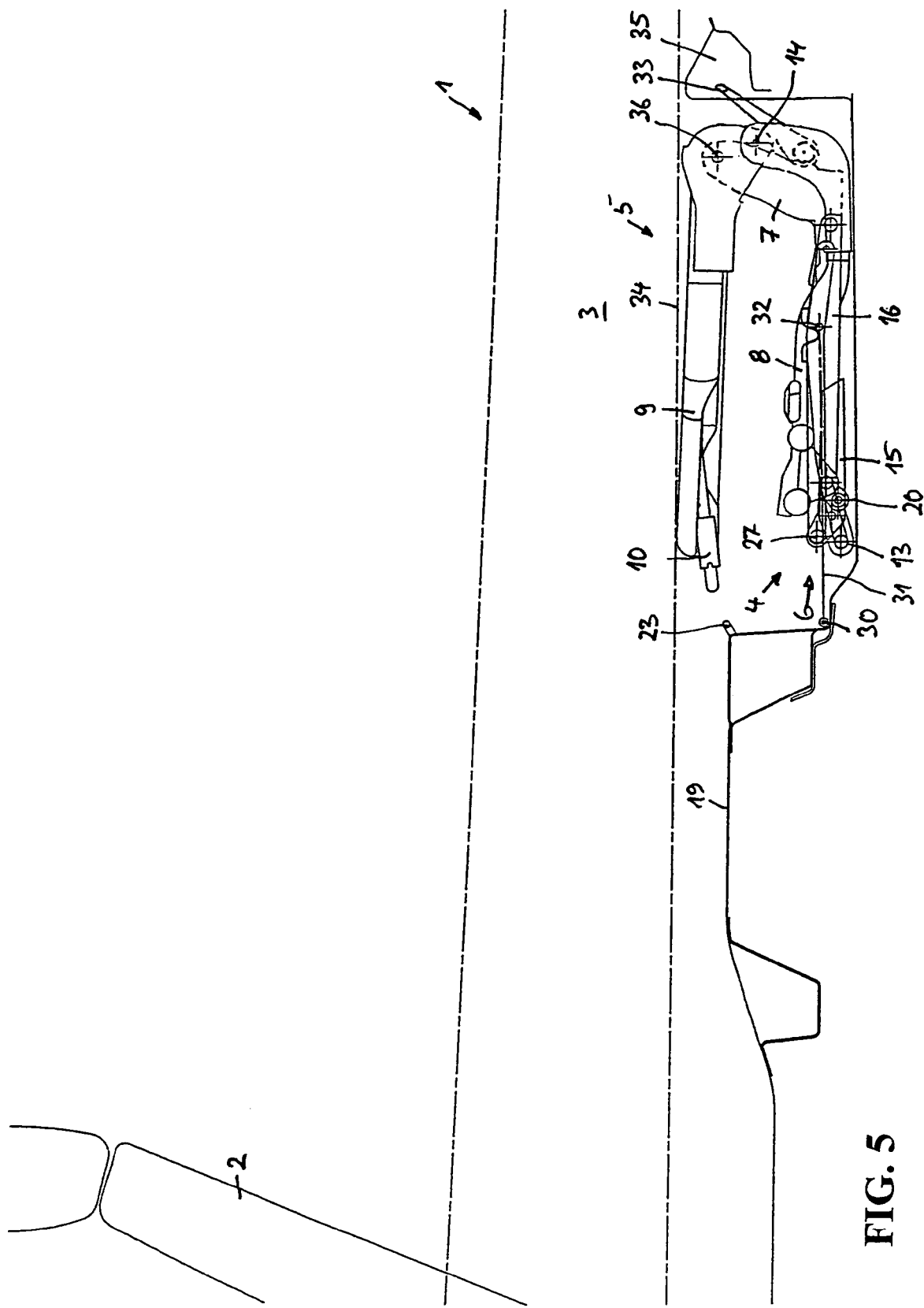
FIG. 5 is an illustration of the seat in its non-use position.

Below, the conversion of the seat 1 from its use position as shown in FIG. 2 to its non-use position as shown in FIG. 5 will be described.

To effect this conversion of the seat 1, pull must be applied to the strap 33. In this manner, first the latching of the folding axis 36 is released, allowing the backrest 5 to be folded forward around the folding axis 36. With continued pulling on the strap 33, the seat cushion frame 7 exerts an amount of torque on the backrest frame 9 in a counterclockwise direction via the lever arm a, so that the backrest 5 begins to pivot forward. Once it passes its vertical position it continues to fold forward under the force of gravity, and thus supports the displacement of the seat cushion frame 8. The backrest 5 is prevented from dropping suddenly onto the seat portion 4 either by the weight of the moving components and/or by a damping element that is not illustrated here. At the same time, the links 11 at the front end of the seat portion 4 are pivoted clockwise around their lower pivot joint 13, so that the seat cushion frame 8 as a whole is shifted downward and toward the rear, and the backrest 5 and the seat portion 4, when folded together, form a flat package.

Figure 3:
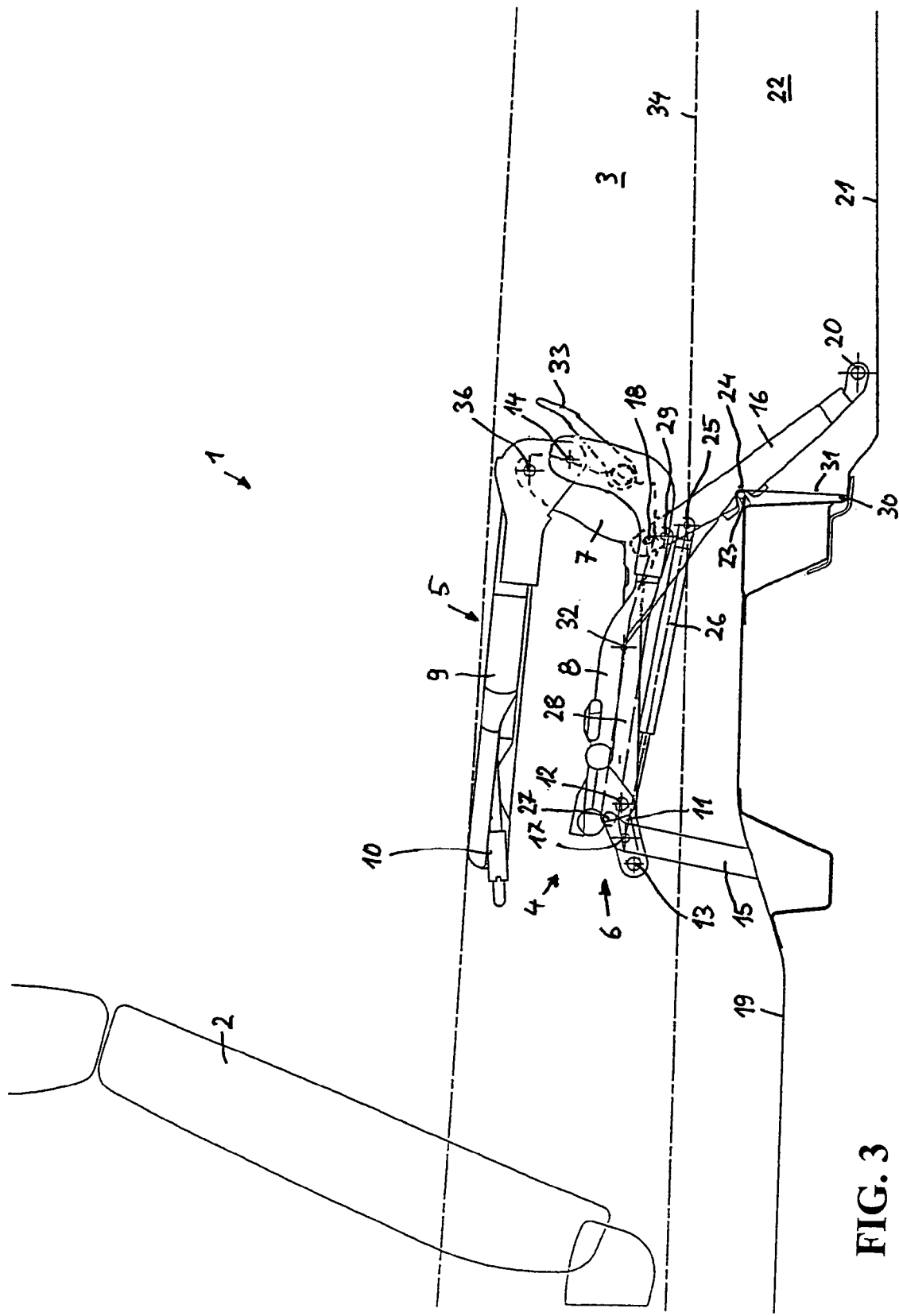
FIG. 3 is an illustration according to FIG. 2 with the backrest folded forward onto the seat portion.

FIG. 3 shows the status when the backrest 5 is completely folded down onto the seat portion 4. With continued pulling on the strap 33, the latching of the rear leg 16 to the latching bracket 23 which is fixed to the body of the vehicle is then released. Further pulling on the strap 33 then causes the rear legs 16 to pivot clockwise around their lower pivot joints 20.

Figure 4:
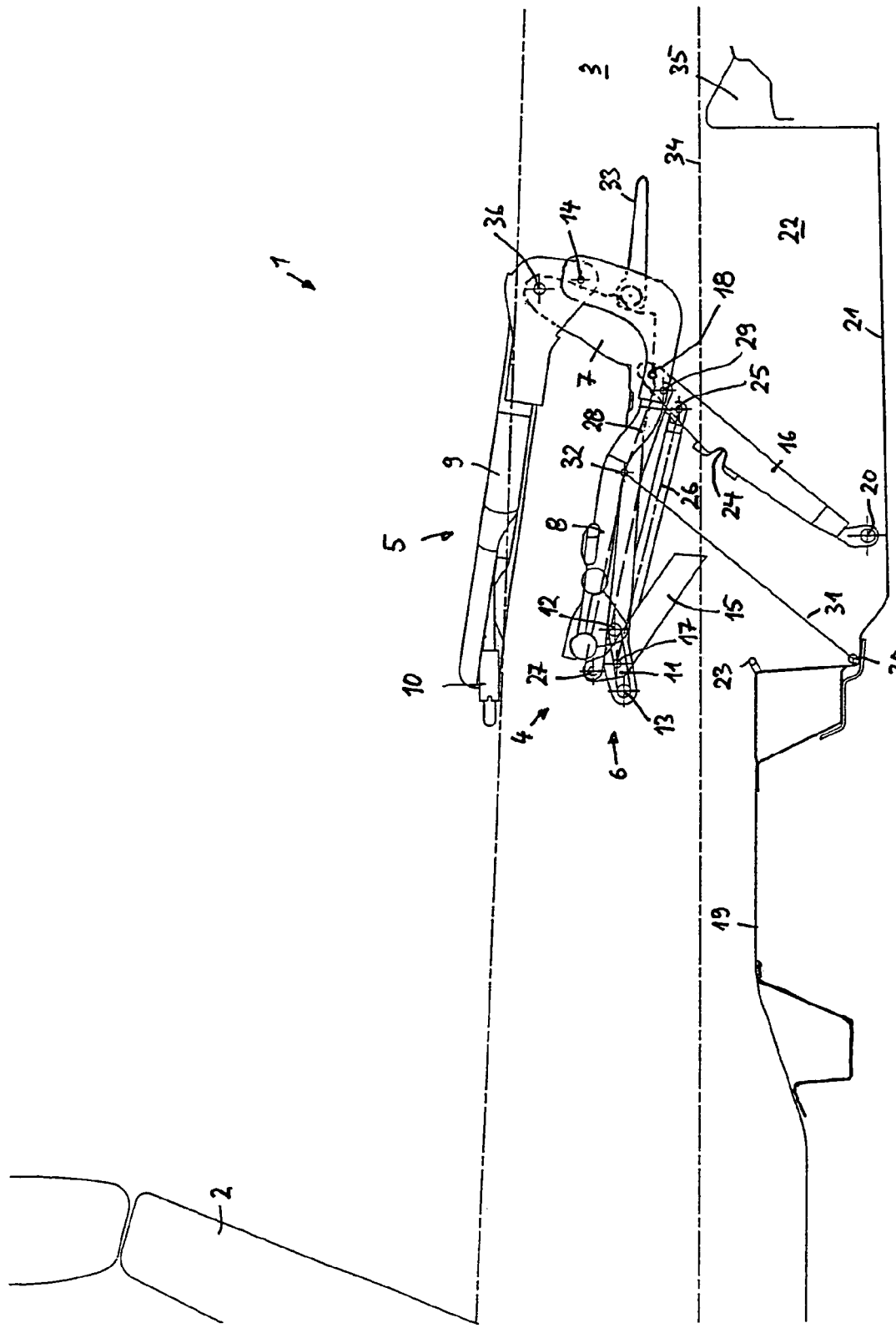
FIG. 4 is an intermediate stage during the conversion of the seat to its non-use position.

FIG. 4 shows an intermediate stage of this pivoting motion. As this illustration shows, during this pivoting motion the backrest/seat portion package remains essentially in a horizontal position, which is accomplished by the interaction of the cable 31 and the pneumatic spring 26. The pneumatic spring 26 is stressed by the pivoting process, as the distance between the end of the pneumatic spring 26 attached at the pivot point 17 and the end attached at the joint 25 on the rear leg 16 is shortened. The pivot joint 29 of the coupling rod 28 is also shifted forward, causing an amount of torque to be induced in the upper end of the front legs 15 via the pivot joint 27 on the same, so that the front legs 15 pivot counterclockwise around the pivot joints 17.

At the end of the pivoting motion of the backrest/seat portion package, the front legs 15 and rear legs 16 lie in an essentially horizontal position within the base frame 7. The seat 1 is now completely collapsed into the recess 22, with the back side of the backrest 5 being essentially flush with the cargo area floor 34. In this situation the seat 1 is locked onto the base 21 of the recess 22 in a manner not shown here, and the pneumatic spring 26 is maximally stressed.

When the seat 1 is lowered into the recess 22, the pull strap 33 projects into a handle recess 35 provided in the edge of the cargo area, from which it is easily accessible.

In order to convert the seat 1 back to its use position, pull is exerted on the strap 33, whereby the seat 1 is first unlatched and pulled out of the recess 22. The continued pivoting motion is then assisted by the unstressing pneumatic spring 26.

While this invention has been described as having a preferred configuration, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Seat for a rear row of seats in a vehicle, the seat comprising:
    a) a seat portion frame, a backrest frame, a seat portion, and a backrest;
    b) the backrest being foldable forwardly onto the seat portion around a folding axis located between the seat portion frame and the backrest frame;
    c) front and rear legs, and the front and rear legs each connected via a pivot joint to the seat portion frame, and the front legs being detachably supported on a floor of a vehicle, in use, and the rear legs being pivotably fastened to the floor of the vehicle at their lower ends via a pivot joint, in use;
    d) the backrest being unlatchable by a strap attached to a back side of the seat, thus allowing it to be folded forward onto the seat portion to define a package, and after which the package including the seat portion and the forward-folded backrest can be pivoted around the pivot joints of the rear legs, once a latching of the legs on the vehicle floor has been released, with the back side of the backrest facing upward, into a recess that is provided in a cargo area behind the row of seats of a vehicle, in use, and such that the back side of the backrest ultimately is substantially flush with the floor of the cargo area, in use;
    e) the seat portion frame including a base frame and a seat cushion frame;
    f) the front and rear legs being attached to the base frame, and the folding axis with the backrest being defined in the base frame;
    g) the back end of the seat cushion frame being connected to the backrest frame on both sides via a pivot joint arranged at a distance in front of the folding axis, and its front end being supported on both sides on the base frame via links; and
    h) the strap being secured at the back end of the seat cushion frame, and the strap being configured and located so that, in use, by pulling on the strap, first the folding axis of the backrest is unlatched, and so that with continued pulling on the strap with a simultaneous lowering of the seat cushion frame relative to the base frame, the backrest is automatically lowered onto the seat portion, and with continued pulling on the strap the rear legs are unlatched and the seat can be lowered into the recess of a vehicle, in use.

2. Seat according to claim 1, wherein:
    a) an upper pivot joint is provided on the rear legs, and below the upper pivot joint on one of the rear legs one end of a pneumatic spring is pivotably attached to the rear leg, and its other end is pivotably supported on the base frame at the pivot joint of the allocated front leg.

3. Seat according to claim 2, wherein:
a) the rear legs are attachable to the vehicle floor, in use, by latching brackets fastened to the vehicle body, which engage in depressions positioned between the upper and lower pivot joints of the rear legs, and which operate in conjunction with internal latching elements in the rear legs.

4. Seat according to claim 3, wherein:
a) between the joint which connects one of the front legs to the base frame and the joint that connects the rear leg on the same side of the seat to the base frame, a tensioned cable is fastened to the base frame, and the other end of the cable being fastened a distance from a lower pivot joint of the rear leg on the base of the recess.

5. Seat according to claim 4, wherein:
a) when the seat is in its use position, the cable is guided taut over one of the latching brackets.

6. Seat according to claim 5, wherein:
a) the front legs extend upward beyond their respective pivot joint with the base frame, and at this end a coupler is linked via a pivot joint, and its other end is connected to the rear legs via a pivot joint positioned below the pivot joint which connects the rear legs to the base frame.

7. Seat according to claim 1, wherein:
a) an upper pivot joint and a lower pivot joint are provided on the rear legs; and
b) the rear legs are attachable to the vehicle floor, in use, by latching brackets fastened to the vehicle body, which engage in depressions positioned between the upper and lower pivot joints of the rear legs, and which operate in conjunction with internal latching elements in the rear legs.

* * * * *